United States Patent [19]

Okinoshima et al.

[11] Patent Number: 5,258,487
[45] Date of Patent: Nov. 2, 1993

[54] POLYAMIDO-ACID COPOLYMER AND ITS MANUFACTURE

[75] Inventors: Hiroshige Okinoshima, Annaka; Hiroshi Kanbara, Takasaki, both of Japan

[73] Assignee: Shin-Etsu Chemical Co., Ltd., Tokyo, Japan

[21] Appl. No.: 739,434

[22] Filed: Aug. 2, 1991

[30] Foreign Application Priority Data

Aug. 3, 1990 [JP] Japan ................... 2-206528

[51] Int. Cl.$^5$ ............................ C08G 69/26
[52] U.S. Cl. ...................... 528/353; 528/26; 528/28; 528/125; 528/126; 528/128; 528/170; 528/172; 528/173; 528/176; 528/220; 528/350
[58] Field of Search .............. 528/26, 28, 125, 126, 528/128, 170, 173, 172, 176, 220, 350, 353

[56] References Cited

U.S. PATENT DOCUMENTS 4,499,149 2/1985 Berger ........................ 528/26
4,847,358 7/1989 Kojima et al. ................. 528/125

*Primary Examiner*—Morton Foelak
*Assistant Examiner*—Shelley A. Dodson
*Attorney, Agent, or Firm*—Oblon, Spivak, McClelland, Maier & Neustadt

[57] ABSTRACT

The present polyamido-acid copolymer has a polymerization backbone chain represented by the following formula:

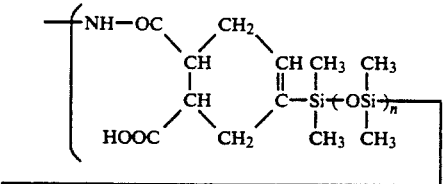
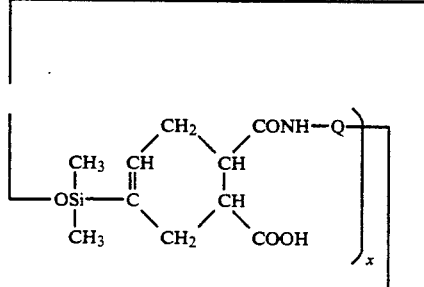
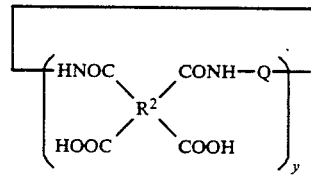

wherein q represents a bivalent organic group and R represents a tetravalent aromatic group. This copolymer forms a polyimide resin film excellent in adhesion to various inorganic substances and mechanical strength.

8 Claims, No Drawings

POLYAMIDO-ACID COPOLYMER AND ITS MANUFACTURE

BACKGROUND OF THE INVENTION

1. Field of the Invention

The present invention relates to a novel polyamido-acid copolymer capable of forming a polyimide resin film excellent in adhesion and mechanical strength and a process for producing it.

2. Description of the Prior Art

Polyimide resins are excellent in electrical properties and mechanical strength and their use for, for example, protective films for the surface of semiconductor devices are attracting attention.

However, since generally polyimide resins are weak extremely in adhesion to inorganic materials, if they are used for protective films for the surface of semiconductor devices, there is a problem that the above properties of polyimide resins are not exhibited well enough.

To cope with this problem, introduction of various silane coupling agents has been studied and as a result the adhesion to inorganic materials has been improved.

However, if a siloxane skeleton is introduced in a polyimide resin, the adhesion to inorganic materials is improved but the mechanical strength drops disadvantageously.

SUMMARY OF THE INVENTION

Therefore, an object of the present invention is to provide a polyamido-acid copolymer capable of forming a polyimide resin film improved in adhesion to inorganic materials without damaging properties such as mechanical strength inherent in polyimide resins.

According to the present invention, there is provided a polyamido-acid copolymer, comprising (A) building blocks derived from an organosilicon compound represented by the general formula [I]:

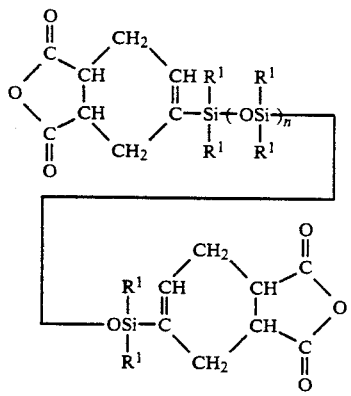

wherein groups $R^1$, which may be the same or different, each represent a substituted or unsubstituted monovalent hydrocarbon group having 1 to 10 carbon atoms and n is an integer of 0 to 100, (B) building blocks derived from a tetracarboxylic dianhydride represented by the general formula [II]:

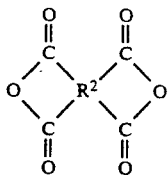

wherein $R^2$ represents a tetravalent aromatic group, and (C) building blocks derived from an organic diamine compound represented by the general formula [III]:

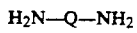

$$H_2N-Q-NH_2 \quad [III]$$

wherein Q represents a bivalent organic group.

This polyamido-acid copolymer is produced by reacting the above organosilicon compound (A), tetracarboxylic acid (B), and organic diamine (C) in an organic solvent at a temperature of 100° C. or below.

Since the above polyamido-acid copolymer of the present invention can form a polyimide resin film excellent in adhesion to various inorganic materials and mechanical strength by heating said polyamido-acid copolymer, the polyamido-acid copolymer is preferably used, for example, for the formation of a protective film on the surface of semiconductor devices.

DETAILED DESCRIPTION OF THE INVENTION

(A) Organosilicon Compounds

As apparent from the above general formula [I], the organosilicon compound (A) used for the formation of the present polyamido-acid copolymer is a polysiloxane wherein 1,2,3,6-tetrahydrophthalic anhydride groups are attached to the both ends of a siloxane skeleton.

In the above general formula [I], the unsubstituted or substituted monovalent hydrocarbon group $R^1$ having 1 to 10 carbon atoms includes, for example, an unsubstituted or substituted alkyl group, alkenyl group, and aryl group. Specific examples of the unsubstituted or substituted alkyl group include a methyl group, a propyl group, and a butyl group, and those groups obtained by replacing part or all of the hydrogen atoms of these groups with halogen atoms such as chlorine, fluorine, and bromine atoms. The alkenyl group includes a vinyl group, an allyl group, and a butenyl group, and those groups obtained by replacing part or all of the hydrogen atoms of these groups with halogen atoms. The unsubstituted or substituted aryl group includes, for example, a phenyl group, a tolyl group, a xylyl group, and a naphthyl group, and those groups obtained by replacing part or all of the hydrogen atoms of these groups with halogen atoms. In the present invention, among these groups, a methyl group and a phenyl group are particularly preferable.

In the general formula [I], n is an integer of 0 to 100.

The above organosilicon compounds (A) can be used singly or as a mixture of two or more.

(B) Tetracarboxylic Anhydrides

Examples of the tetracarboxylic dianhydride (B) represented by the above general formula (II) used for the formation of the polyamido-acid copolymer of the present invention include pyromellitic dianhydride, benzophenonetetracarboxylic dianhydride, 2,3,6,7-naphthalenetetracarboxylic dianhydride, 3,3',4,4'-diphenyltetracarboxylic dianhydride, 2,2',3,3'-diphenyltetracarboxylic dianhydride, and 2,2-bis(3,4-dicarboxyphenyl)-propane dianhydride, which may be used singly or as a mixture of two or more.

In the present invention, particularly preferable tetracarboxylic dianhydrides are pyromellitic dianhydride and benzophenonetetracarboxylic dianhydride.

(C) Organic Diamines

In the general formula [III] representing an organic diamine (C) in the polyamido-acid copolymer of the present invention, the bivalent organic group Q includes, for example, groups having an aromatic ring. Specific examples of the organic diamine include phenylenediamine, 4,4'-diaminodiphenylmethane, 4,4'-diaminodiphenylpropane, 4,4'-methylenedianiline, benzidine, 4,4'-diaminodiphenylsulfide, 4,4'-diaminodiphenylsulfone, 4,4'-diaminodiphenyl ether, 1,5-diaminonaphthalene, 3,3'-dimethylbenzidine, and 2,2-bis[4-(N-phenylphthalimido-4-oxy)phenyl]propane, which may be used singly or as a mixture of two more more.

Preferable organic diamines are phenylenediamine and 4,4'-diaminodiphenylmethane.

Preparation of the Polyamido-Acid Copolymer

The polyamino-acid copolymer of the present invention is produced by reacting the above-mentioned components (A) to (C) in the presence of an organic solvent.

As the organic solvent any organic solvent can be used so long as it does not hamper the reaction, but particularly preferably a polar solvent such as N-methyl-2-pyrrolidone, N,N-dimethylacetamide, and N,N-dimethylformamide is used.

Generally, the reaction is carried out by dissolving the organic diamine (C) in the above organic solvent and by adding to the solution prescribed amounts of the organosilicon compound (A) and the tetracarboxylic dianhydride (B) and the reaction temperature is desirably 100° C. or below, in particular 50° C. or below. If the reaction temperature is too high, sometimes disadvantageously polyimido linkages are partly formed (i.e., gelation occurs). Therefore, during the reaction it is desirable to control the temperature of the reaction system by cooling from outside.

The amounts of the components (A) to (C) are set such that preferably the molar ratio of the total amount of the organosilicon compound (A) plus the tetracarboxylic dianhydride (B) to the amount of the organic diamine (C) is about 1:1 and preferably the molar ratio (A/B) of the organosilicon compound (A) to the tetracarboxylic dianhydride (B) is in the range of 1/1 to 1/100. If the amount of the organosilicon compound (A) is too small, there is a tendency that the effect of improving the adhesion to inorganic materials is not achieved adequately whereas if the amount is excessive the mechanical strength is apt to decline.

The Polyamido-Acid Copolymer

The polyamido-acid copolymer of the present invention thus obtained comprises building blocks derived from the above-mentioned components (A) to (C) and generally the building blocks derived from the component (C) are present in an equimolar amount to the sum of the building blocks derived from the components (A) and (B), and the molar ratio (A/B) of the building blocks derived from the component (A) to the building blocks derived from the component (B) is in the range of 1/1 to 1/100. The polymer backbone chain is, for example, represented by the following formula:

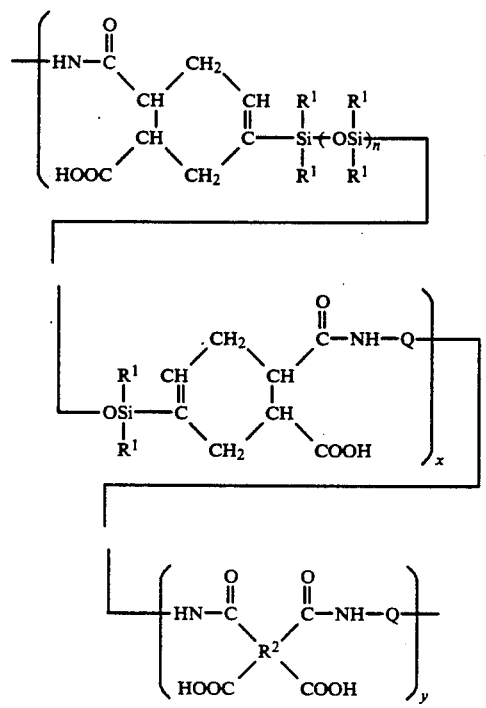

wherein $R^1$, $R^2$, Q, and n have the meanings defined above and x and y are each a positive integer.

Generally, this polyamido-acid copolymer has a reduced viscosity in a state of a 0.5 % solution in N-methylpyrrolidone at 30° C. from 0.3 to 3.0 dl/g, preferably from 0.5 to 2.0 dl/g.

In the above-mentioned polyamido-acid copolymer, the sequences of the building block derived from the organosilicon dianhydride (B) may follow one another along the backbone chain like a so-called block copolymer or the two blocks may arranged at random.

The polyamido-acid copolymer of the present invention can be formed into a polyimide resin film, for example, by applying a solution of the polyamido-acid copolymer in an organic solvent to a suitable substrate followed by heat treatment. This polyimide resin film is excellent in mechanical strength and also exhibits excellent adhesion to inorganic materials such as metals including gold, silver, copper, aluminum, nickel, chromium, and tin or alloy materials, nonmetallic materials including silicon and germanium, and inorganic insulating materials including ceramics, glass, and $SiO_2$. Accordingly, the polyamido-acid copolymer of the present invention can form a polyimide resin film firmly adhered to the surface of a substrate made of the inorganic material mentioned above.

The application of the organic solvent solution containing the polyamido-acid copolymer onto the surface of a substrate can be carried out by using a spinner for example. The heat treatment is carried out by drying for 10 to 60 min generally at 70° to 300° C., preferably at 100° to 250° C., by heating and then by heating for 30 to 300 min at 250° to 400° C. to effect dehydration ring closure.

(EXAMPLES)

Example 1

9.9 g (50 mmol) of methylenedianiline and 15 g of N-methyl-2-pyrrolidone were charged into a 200-ml flask equipped with a thermometer, a stirrer, and a dropping funnel and were stirred to be mixed and then 2.17 g (5 mmol) of 1,1,3,3-tetramethyl-1,3-bis-[4-(1,2,3,6-tetrahydrophthalic anhydride)]disiloxane, 14.49 g (45 mmol) of 3,3'4,4'-benzophenonetetracarboxylic dianhydride, and 66.8 g of N-methyl-2-pyrrolidone were added over about 30 min while keeping the reaction temperature at 40° C. or below.

After the addition, maturing was effected at room temperature for 8 hours and then the mixture was filtered with a 1μ milipore filter. (The above reaction all was carried out under a flow of dry $N_2$ so that moisture in the air might not enter the reaction system.). The reaction liquid thus obtained was subjected to measurement of an infrared spectrum, and characteristic absorption bands at 1,720 cm$^{-1}$ and 1,660 cm$^{-1}$ due to the carbonyl group ($>C=O$) of amido-acids were recognized. From the result, it was confirmed that the polymer contained amido-acid moieties. The reduced viscosity under the same conditions as described above of this polymer was measured to be 0.80 dl/g.

The reaction liquid obtained by this synthesis reaction was applied to the surface of an Ni substrate by a spinner under conditions of the speed of 3,000 rpm/sec and then was cured by heating at 150° C. for 1 hour and then at 250° C. for 4 hours to form a polyimide resin film.

The adhesion of this polyimide resin film was measured by the cross cut peeling test and the breaking strength of the resin film was measured by using a tesnsile tester (AGS-500B, manufactured by Shimadzu Seisakusho Ltd.). The obtained results are shown in Table 1.

EXAMPLE 2

9.9 g (50 mmol) of methylenedianiline and 15 g of N-methyl-2-pyrrolidone were charged into the same flask as that used in Example 1, then 2.79 g (5 mmol) of 1,3-dimethyl-1,3diphenyl-1,3-bis-[4-(1,2,3,6-tetrahydrophthalic anhydride)]disiloxane, 14.49 g (45 mmol) of 3,3',4,4'-benzophenonetetracarboxylic dianhydride, and 68.8 g of N-methyl-2-pyrrolidone were added in the same manner as that in Example 1, and the same procedures as those in Example 1 were carried out to obtain a reaction liquid. The reaction liquid thus obtained was subjected to measurement of an infrared spectrum, and characteristic absorption bands at 1,720 cm$^{-1}$ and 1,660 cm$^{-1}$ due to the carbonyl group ($>C=O$) of amido-acids were recognized. From the result, it was confirmed that the polymer contained amido-acid moieties. The reduced viscosity under the same conditions as described above of this polymer was measured to be 0.85 dl/g.

This reaction liquid was applied in the same manner as that in Example to an Ni substrate to form a polyimide resin film under the same conditions as those in Example 1 and the adhesion and the breaking strength of the resin film were measured. The results are shown in Table 1.

COMPARATIVE EXAMPLE 1

9.9 g (50 mmol) of methylenedianiline and 15 g of N-methyl-2-pyrrolidone were charged into the same flask as that used in Example 1, then 16.1 g (50 mmol) of 3,3',4,4'-benzophenonetetracarboxylic dianhydride and 65.1 g of N-methyl-2-pyrrolidone were added in the same manner as that in Example 1, and the same procedures as those in Example 1 were carried out to obtain a reaction liquid. The reaction liquid thus obtained was subjected to measurement of an infrared spectrum, and characteristic absorption bands at 1,720 cm$^{-1}$ and 1,660 cm$^{-1}$ due to the carbonyl group ($>C=O$) of amido-acids were recognized. From the result, it was confirmed that the polymer contained amido-acid moieties. The reduced viscosity under the same conditions as described above of this polymer was measured to be 1.0 dl/g.

This reaction liquid was applied in the same manner as that in Example to an Ni substrate to form a polyimide resin film under the same conditions as those in Example 1 and the adhesion and the breaking strength of the resin film were measured. The results are shown in Table 1.

COMPARATIVE EXAMPLE 2

8.91 g (45 mmol) of methylenedianiline, 1.24 g (5 mmol) of 1,3-bis(3-aminopropyl)tetramethylsiloxane and 15 g of N-methyl-2-pyrrolidone were charged into the same flask as that used in Example 1, then 16.1 g (50 mmol) of 3,3',4,4'-benzophenonetetracarboxylic dianhydride and 65.9 g of N-methyl-2-pyrrolidone were added to the mixture and the same procedures as those in Example 1 were carried out to obtain the intended reaction liquid. The reaction liquid thus obtained was subjected to measurement of an infrared spectrum, and characteristic absorption bands at 1,720 cm$^{-1}$ and 1,660 cm$^{-1}$ due to the carbonyl group ($>C=O$) of amido-acids were recognized. From the result, it was confirmed that the polymer contained amido-acid moieties. The reduced viscosity under the same conditions as described above of this polymer was measured to be 0.55 dl/g.

This reaction liquid was applied in the same manner as that in Example to an Ni substrate to form a polyimide resin film under the same conditions as those in Example 1 and the adhesion and the breaking strength of the resin film were measured. The results are shown in Table 1.

The values showing the amounts of the reactants in Table 1 are given as relative amounts in molar basis.

TABLE 1

| | Example 1 | Example 2 | Comparative Example 1 | Comparative Example 2 |
|---|---|---|---|---|
| Reactant (acid anhydride) | | | | |

TABLE 1-continued

| | Example 1 | Example 2 | Comparative Example 1 | Comparative Example 2 |
|---|---|---|---|---|
| benzophenone tetracarboxylic dianhydride | 90 | 90 | 100 | 100 |
| bis(dimethylsilyl) organosilicon dianhydride | 10 | 0 | 0 | 0 |
| bis(methylphenylsilyl) organosilicon dianhydride | 0 | 10 | 0 | 0 |
| Reactant (diamine) | | | | |
| $H_2N$—C$_6H_4$—$CH_2$—C$_6H_4$—$NH_2$ | 100 | 100 | 100 | 90 |
| $H_2N(CH_2)_3Si(CH_3)_2$—O—$Si(CH_3)_2(CH_2)_3NH_2$ | 0 | 0 | 0 | 10 |
| Breaking strength (kg/mm$^2$) | 14.6 | 15.0 | 14.7 | 12.5 |
| Adhesion (cross cut peeling test) | 100/100 | 100/100 | 0/100 | 100/100 |

We claim:

1. A polyamido-acid copolymer, comprising
(A) building blocks derived from an organosilicon compound represented by the general formula [I]:

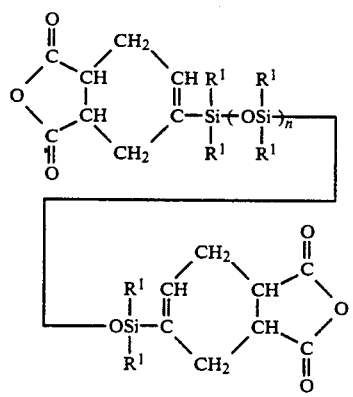

wherein groups $R^1$, which may be the same or different, each represent a substituted or unsubstituted monovalent hydrocarbon group having 1 to 10 carbon atoms and n is an integer of 0 to 100, (B) building blocks derived from a tetracarboxylic dianhydride represented by the general formula [II]:

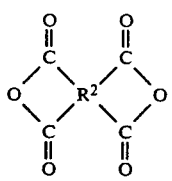

wherein $R^2$ represents a tetravalent aromatic group, and (C) building blocks derived from an organic diamine compound represented by the general formula [III]:

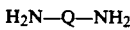

$$H_2N-Q-NH_2 \qquad [III]$$

wherein Q represents a bivalent organic group.

2. A polyamido-acid copolymer as claimed in claim 1, wherein the building blocks derived from said organic diamine (C) are contained in an equimolar amount to the sum of the building blocks derived from the organosilicon compound (A) and the tetracarboxylic dianhydride (B) and the molar ratio of the building blocks derived from the organosilicon compound (A) to the building blocks derived from the tetracarboxylic dianhydride (B) is in the range of 1/1 to 1/100.

3. A polyamido-acid copolymer as claimed in claim 1, wherein, in the general formula [I]representing said organosilicon compound (A), the group $R^1$ represents a methyl group or a phenyl group.

4. A polyamido-acid copolymer as claimed in claim 1, wherein, said tetracarboxylic dianhydride (B) is at least one acid dianhydride selected from the group consisting of pyromellitic dianhydride, benzophenonetetracarboxylic dianhydride, 2,3,6,7-naphthalenetetracarboxylic dianhydride, 3,3',4,4'-diphenyltetracarboxylic dianhydride, 2,2',3,3'-diphenyltetracarboxylic dianhydride, and 2,2-bis(3,4-dicarboxyphenyl)propane dianhydride.

5. A polyamido-acid copolymer as claimed in claim 1, wherein, in the general formula [III]representing said organic diamine (C), the bivalent organic group Q is an aromatic ring-containing group.

6. A polyamido-acid copolymer as claimed in claim 1, wherein, said organic diamine is at least one organic diamine selected from the group consisting of phenylenediamine, 4,4'-diaminodiphenylmethane, 4,4'-diaminodiphenylpropane, 4,4'-methylenedianiline, benzidine, 4,4'-diaminodiphenylsulfide, 4,4'-diaminodiphenylsulfone, 4,4'-diaminodiphenyl ether, 1,5-diaminonaphthalene, 3,3'-dimethylbenzidine, and 2,2-bis[4-(N-phenylphthalimido-4-oxy)phenyl]propane.

7. A process for producing a polyamido-acid copolymer, wherein said organosilicon compound (A), said tetracarboxylic dianhydride (B), and said organic diamine compound (C) are reacted in an organic solvent at a temperature of 100° C. or below.

8. A polyimide resin film obtained by heat treating the polyamido-acid copolymer as claimed in claim 1.

* * * * *